US012637554B2

(12) United States Patent
Fiorenza et al.

(10) Patent No.: US 12,637,554 B2
(45) Date of Patent: May 26, 2026

(54) HIGH IMPERMEABILITY INNERLINER COMPOUND AND METHOD FOR THE PRODUCTION THEREOF

(71) Applicant: Bridgestone Europe NV/SA [BE/BE], Zaventem (BE)

(72) Inventors: Paolo Fiorenza, Rome (IT); Gianpaolo Chieffi, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 437 days.

(21) Appl. No.: 17/920,161

(22) PCT Filed: Apr. 20, 2021

(86) PCT No.: PCT/EP2021/060202
§ 371 (c)(1),
(2) Date: Oct. 20, 2022

(87) PCT Pub. No.: WO2021/214038
PCT Pub. Date: Oct. 28, 2021

(65) Prior Publication Data
US 2023/0167284 A1      Jun. 1, 2023

(30) Foreign Application Priority Data
Apr. 21, 2020      (IT) ........................ 102020000008497

(51) Int. Cl.
| | |
|---|---|
| *C08L 19/00* | (2006.01) |
| *B60C 1/00* | (2006.01) |
| *C08C 19/20* | (2006.01) |
| *C08K 3/04* | (2006.01) |
| *C08K 3/22* | (2006.01) |
| *C08K 3/30* | (2006.01) |
| *C08K 3/34* | (2006.01) |

(52) U.S. Cl.
CPC ............ *C08L 19/00* (2013.01); *B60C 1/0008* (2013.01); *C08C 19/20* (2013.01); *C08K 3/04* (2013.01); *C08K 3/22* (2013.01); *C08K 3/30* (2013.01); *C08K 3/346* (2013.01); *C08K 2003/2296* (2013.01); *C08K 2201/014* (2013.01); *C08L 2312/00* (2013.01)

(58) Field of Classification Search
None
See application file for complete search history.

(56) References Cited

U.S. PATENT DOCUMENTS

| | | | | |
|---|---|---|---|---|
| 5,885,389 A | * | 3/1999 | Sandstrom | ................ B60C 1/00 |
| | | | | 152/543 |
| 2010/0190885 A1 | * | 7/2010 | Hua | ........................ C08L 21/00 |
| | | | | 523/209 |
| 2016/0122515 A1 | * | 5/2016 | Karampelas | .............. C08L 1/04 |
| | | | | 106/204.3 |
| 2021/0371630 A1 | * | 12/2021 | Kadla | ................... C08L 97/005 |
| 2022/0002525 A1 | * | 1/2022 | Kobe | ................ A43B 23/0215 |
| 2023/0078770 A1 | * | 3/2023 | Schwaiger | .............. C08L 15/02 |

FOREIGN PATENT DOCUMENTS

| | | | | | |
|---|---|---|---|---|---|
| EP | 2042346 A1 | 4/2009 | | | |
| EP | 2223928 A1 | 9/2010 | | | |
| EP | 2433813 A1 | 3/2012 | | | |
| EP | 3393824 A1 | 10/2018 | | | |
| EP | 3926007 A1 | * | 12/2021 | ............... | B60C 1/00 |
| WO | WO-2012177679 A1 | * | 12/2012 | ............. | C08K 13/02 |
| WO | WO-2017189718 A1 | * | 11/2017 | ......... | B29D 30/0685 |

OTHER PUBLICATIONS

International Search Authority: International Search Report for corresponding International Patent Application No. PCT/EP2021/060202, dated Aug. 26, 2021, 3 pages.

* cited by examiner

*Primary Examiner* — Katarzyna I Kolb
(74) *Attorney, Agent, or Firm* — Patterson Intellectual Property Law, PC

(57) ABSTRACT

Method for the manufacture of the innerliner compound comprising: —a first mixing step wherein at least one cross-linkable unsaturated chain polymeric base and one filler system are mixed together; —a final mixing step wherein a vulcanization system is added and mixed with the mixture deriving from an earlier mixing step; and —an intermediate mixing step, interposed between said first mixing step and the final mixing step, and wherein lignin is added and mixed into the mixture deriving from a previous mixing step.

4 Claims, No Drawings

HIGH IMPERMEABILITY INNERLINER COMPOUND AND METHOD FOR THE PRODUCTION THEREOF

The present invention relates to an innerliner compound with improved impermeability characteristics and to a method for the production thereof.

For some time within the pneumatic tire industry, the need has been especially felt to impart ever greater impermeability to the innerliner layer.

Here and hereinafter, innerliner layer refers to an inner rubber layer which, insofar as it is substantially impermeable to air, is used in tubeless pneumatic tires in order to maintain under pressure the inflation air confined within the cavity defined by the concavity of the carcass.

Greater impermeability of the innerliner layer ensures lower air diffusion within the carcass, with the consequent advantage of avoiding oxidative degradation phenomena of the portions of the carcass itself and, therefore, of favoring a greater service life for the pneumatic tire.

As is known to a person skilled in the art, one of the most critical parts for the integrity of the carcass is in relation to the belt pack thereof. The belt pack is generally composed of steel belts. In essence, the steel belts form a steel mesh that constitutes the reinforcement of the wheel. The purpose of the steel belts in radial pneumatic tires is to stabilize the carcass of the pneumatic tire within the area of interaction with the road in order to correctly and effectively transfer steering commands from the steering wheel to the road. As can immediately be understood, damage to the steel belts can affect the normal operation of a pneumatic tire.

Another need that is especially felt within the pneumatic tire industry is in relation to the reduction in weight of the pneumatic tire, with positive effects upon the overall energy consumption of the vehicle and upon the rolling resistance.

In this respect, it is immediately apparent how an increase in the impermeability of the innerliner would allow for a decrease in the thickness thereof and, therefore, less weight for the resulting pneumatic tire.

In the context described above, part of the research is focused on increasing the impermeability of the innerliner layer.

The inventors of the present invention have surprisingly found that when lignin is introduced into the compound, in a particular and determined procedural manner, it is possible to impart to the compound itself characteristics of high impermeability to air. Such a solution, if applied to the innerliner compound, is able to meet the needs felt by the pneumatic tire industry, as described above.

To date, the use of lignin is known within compounds for pneumatic tire portions other than the innerliner layer and, above all, in order to reduce viscosity while maintaining unchanged the other characteristics of the compound.

The object of the present invention is a method for the production of the innerliner compound, comprising:

- a first mixing step wherein at least one cross-linkable unsaturated chain polymeric base and a filler system are mixed together;
- a final mixing step wherein a vulcanization system is added and mixed with the mixture deriving from an earlier mixing step;

said method being characterized by the fact that it comprises an intermediate mixing step interposed between said first mixing step and said final mixing step, and wherein the mixture deriving from an earlier mixing step is added and mixed with the lignin.

Here and hereinafter, the term "cross-linkable unsaturated chain polymer base" refers to any natural or synthetic non-cross-linked polymer capable of assuming all of the chemical-physical and mechanical characteristics typically assumed by elastomers upon cross-linking (vulcanization) with sulfur-based systems.

Here and hereinafter, the term filler system refers to the composite consisting of reinforcing fillers such as carbon black and/or silica and/or clay etc.

Here and hereinafter, the term vulcanization system refers to a composite of ingredients comprising at least sulfur and accelerating compounds, which in the preparation of the compound are added in a final mixing step and have the purpose of promoting the vulcanization of the polymer base, once the compound is subjected to a vulcanization temperature.

Preferably, the lignin in an amount of between 5 and 25 phr.

Preferably, the lignin is Kraft lignin.

Preferably, the Kraft lignin is composed of particles having an average surface area of less than 400 $\mu m^2$.

A further object of the present invention is an innerliner compound manufactured using the method, the object of the present invention.

A still further object of the present invention is an innerliner layer manufactured using the compound, the object of the present invention.

A still further object of the present invention is a pneumatic tire comprising an innerliner layer manufactured according to the present invention.

For a better understanding of the invention, the following examples are for illustrative and non-limiting purposes.

EXAMPLES

Ten innerliner compounds were manufactured, wherein four thereof constituted comparative examples and six constituted examples of the invention.

In particular, compound A is a comparison compound that represents an innerliner compound that is commonly used and devoid of lignin as an ingredient;

the three compounds B, E and H are comparison compounds that comprise three respective types of lignin but that was added with a procedure that is different from that of the present invention; the six compounds C, D, F, G, I and L are compounds according to the invention which comprise three respective types of lignin added according to the dictates of the present invention. In particular, the compounds of the invention C, D, F, G, I and L require the use of three types of lignin in two different quantities (7 phr and 14 phr).

Table I shows the compositions in phr of the ten compounds A-L.

TABLE I

|  | A | B | C | D | E | F | G | H | I | L |
|---|---|---|---|---|---|---|---|---|---|---|
| Br-IIR |  |  |  |  |  | 100 |  |  |  |  |
| CB |  |  |  |  |  | 50 |  |  |  |  |
| Clay |  |  |  |  |  | 25 |  |  |  |  |
| ZnO |  |  |  |  |  | 2 |  |  |  |  |
| S |  |  |  |  |  | 1 |  |  |  |  |
| Lignin* 1MB | — | 7 | — | — | — | — | — | — | — | — |
| Lignin* 2MB | — | — | 7 | 14 | — | — | — | — | — | — |
| Lignin** 1MB | — | — | — | — | 7 | — | — | — | — | — |
| Lignin** | — | — | — | — | — | 7 | 14 | — | — | — |

TABLE I-continued

|  | A | B | C | D | E | F | G | H | I | L |
|---|---|---|---|---|---|---|---|---|---|---|
| 2MB Lignin*** | — | — | — | — | — | — | — | 7 | — | — |
| 1MB Lignin*** | | | | | | | | | | |
| 2MB | — | — | — | — | — | — | — | — | 7 | 14 |

In Table I the wording 1 MB refers to a first mixing step; whilst the wording 2 MB refers to a second mixing step.

Br-IIR stands for bromobutyl rubber.

CB is of the N6 type, which denotes a Carbon Black with a surface area equal to 36 $m^2/g$.

Clay is a mineral filler produced and marketed by BASF with the acronym ASP® NC X-1.

Lignin* is the sulfonated lignin marketed by Borregaard with the acronym Borreseperse NA.

Lignin** is the Kraft lignin from soft wood marketed by Stora Enso with the acronym Lineo Classic.

Lignin*** is the Kraft lignin from soft wood marketed by Suzano with the acronym FP602.

Using an electron microscope (Zeiss brand, Auriga model, Secondary Electron—size of the images analyzed about 1 $mm^2$), the average area was revealed of the particles of the three types of lignin used. It was found that the particles of Lignin* have an average surface area of 673 $\mu m^2$; the Lignin particles have an average surface area of 263 $\mu m^2$, the Lignin* particles have an average surface area of 194 $\mu m^2$.

Herebelow, the procedure is given for the preparation of the compounds described in the examples.

—Preparation of the Compounds—

(1st Mixing Step—1 MB)

Before the start of the mixing, a mixer with tangential rotors and an internal volume of between 230 and 270 liters was loaded with the ingredients listed in Table I, excluding the vulcanization system (sulfur, ZnO) and lignin for the compounds of the invention (C, D, F, G, I, L), reaching a fill factor of between 66-72%.

The mixer was operated at a speed of between 40-60 revolutions/minute, and the mixture thus formed was discharged once a temperature of between 140-160° C. had been reached.

($2^{nd}$ Mixing Step—2 MB)

This mixing step only concerned the compounds of the invention (C, D, F, G, I, L). Lignin according to the quantities shown in Table I was added to the mixture produced in the first mixing step. The mixture is discharged once it reaches a temperature of between 130-150° C.

(Final Mixing Step)

To the mixture obtained from the first mixing step (1 MB) for the comparison compounds (A, B, E, H), and to the mixture obtained from the second mixing step (2 MB) for the compounds of the invention (C, D, F, G, I, L) the vulcanization system (sulfur, ZnO) was added, reaching a filling factor of between 63-67%.

The mixer was operated at a speed of between 20-40 revolutions/minute, and the mixture thus formed was discharged once a temperature of between 100-110° C. had been reached.

The compounds A-L, reported above, were used to make respective test specimens, which were subjected to an evaluation test in order to verify properties in terms of fragility (brittleness), M300% and impermeability to oxygen.

The oxygen impermeability test was performed on materials with a thickness of 0.7 mm and using a conventional apparatus as MOCON® OX-TRA® (model 2/61). The measurements were made at a temperature of 25° C.

The mechanical tests were performed according to the ISO-812 standard.

For easier interpretation of the results obtained, the impermeability values are given in a form that is indexed with reference to the results of the comparison compound generally used for the implementation of an innerliner layer (Compound A).

With regard to the M300 Brittleness and impermeability to oxygen values reported in Tables II and III, it must be specified that the lower the reported value, the better the characteristic.

TABLE II

|  | A | B | C | D | E | F | G |
|---|---|---|---|---|---|---|---|
| M300 | 3.7 | 3.3 | 4.6 | 4.1 | 3.2 | 3.3 | 3.3 |
| Brittleness E'Mpa(−40° C.) | 698 | 698 | 693 | 653 | 841 | 1048 | 1107 |
| Permeability | 100 | 104 | 90 | 82 | 100 | 81 | 73 |

TABLE III

|  | H | I | L |
|---|---|---|---|
| M300 | 3.4 | 3.5 | 3.5 |
| Brittleness E'Mpa(−40° C.) | 791 | 649 | 801 |
| Permeability | 94 | 86 | 79 |

From the data reported in Tables II and III, it is clear how the compounds according to the present invention ensure a significant improvement in terms of permeability to oxygen, whilst maintaining the mechanical property values within permissible ranges. In fact, as will be immediately obvious to a technician in the field, all of the M300 and Brittleness values reported can be considered to be eligible for an innerliner layer.

The values reported in Tables II and III demonstrate how the effects of lignin, in terms of impermeability to oxygen, prove to be surprisingly different, if the same lignin is added in the first mixing step or in the second mixing step. In fact, the values in relation to compounds B and E demonstrate that if the lignin is added in the first mixing step then the permeability to oxygen remains unchanged, or is even worse compared to the comparison compound A.

In light of the above, it can be stated that the technical effect resulting from the addition of the lignin in a mixing step subsequent to the first (wherein all of the ingredients except the vulcanization system are mixed) should clearly be considered to be unexpected and surprising.

The invention claimed is:

1. A method for the manufacture of an innerliner compound, the method comprising:

a first mixing step wherein at least one cross-linkable unsaturated chain polymeric base and a filler system including clay are mixed together;

a final mixing step wherein a vulcanization system is added and mixed with the mixture deriving from an earlier mixing step; and an intermediate mixing step interposed between said first mixing step and said final mixing step, wherein lignin is added in an amount of between 5 phr and 25 phr and mixed into a mixture deriving from a previous mixing step;

wherein the lignin is not added during the first mixing step, and is composed of particles having an average surface area of less than 400 $\mu m^2$.

2. The method of claim 1, further comprising manufacturing an innerliner layer using an innerliner compound manufactured according to the mixing steps.

3. The method of claim 2, further comprising manufacturing a pneumatic tire comprising the innerliner layer.

4. The method of claim 1, wherein the lignin is Kraft lignin.

\* \* \* \* \*